(12) United States Patent
Uratani (10) Patent No.: US 6,675,069 B2
(45) Date of Patent: Jan. 6, 2004

(54) ARM OPERATION MECHANISM AND INDUSTRIAL ROBOT INCORPORATING THE SAME

(75) Inventor: Takafumi Uratani, Nara (JP)

(73) Assignee: Daihen Corporation, Osaka (JP)

(*) Notice: Subject to any disclaimer, the term of this patent is extended or adjusted under 35 U.S.C. 154(b) by 0 days.

(21) Appl. No.: 10/131,770

(22) Filed: Apr. 23, 2002

(65) Prior Publication Data

US 2002/0161481 A1 Oct. 31, 2002

(30) Foreign Application Priority Data

Apr. 26, 2001 (JP) ........................................ 2001-128746

(51) Int. Cl.[7] ............................................. G06F 19/00
(52) U.S. Cl. ..................... 700/245; 700/254; 700/260; 700/261; 700/262; 901/42; 901/14; 901/15; 901/16; 362/423; 362/424; 362/259; 219/121.78; 414/696; 414/751.1
(58) Field of Search ..................... 700/245, 254, 700/260, 261, 262; 362/423, 424, 259; 219/121.78; 901/42, 14, 15, 16; 414/751.1, 696, 733, 700, 710, 917; 74/25, 112, 122, 569; 248/281.11, 586

(56) References Cited

U.S. PATENT DOCUMENTS 4,534,694 A * 8/1985 Tuda ........................... 414/735
4,953,822 A * 9/1990 Sharber et al. ......... 248/281.11
5,678,979 A * 10/1997 Kovacs ........................ 414/700
6,068,704 A * 5/2000 Saeki et al. ............. 156/345.32
6,450,757 B1 * 9/2002 Saeki et al. ............... 414/744.5

FOREIGN PATENT DOCUMENTS

JP    2000-024966    1/2000

OTHER PUBLICATIONS

Nenchev, PARA–Arm Singularity Perturbed Design of a Planar 2 DOF Parallel Manipulator, 1996, IEEE, pp. 1234–1240.*
FANUC, News of Mar. 1998, Internet, pp. 1–2.*
Nobuji et al., INtroducing linear servo motor system, 1998, Internet, pp. 1–6.*

* cited by examiner

Primary Examiner—William A. Cuchlinski, Jr.
Assistant Examiner—McDieunel Marc
(74) Attorney, Agent, or Firm—Merchant & Gould P.C.

(57) ABSTRACT

An arm operation mechanism for an industrial robot includes a support, a first arm, a second arm, a link base, a parallel link and a conversion mechanism. The first arm has a base end pivotally connected to the support for rotation relative to the support. The second arm has a base end pivotally connected to a tip end of the first arm for rotation relative to the first arm. The link base is pivotally connected to the first arm for rotation relative to the first arm. The parallel link keeps a constant posture of the link base upon the rotation of the first arm. The conversion mechanism converts the rotation of the link base relative to the first arm into the rotation of the second arm relative to the link base.

15 Claims, 6 Drawing Sheets

ARM OPERATION MECHANISM AND INDUSTRIAL ROBOT INCORPORATING THE SAME

BACKGROUND OF THE INVENTION

1. Field of the Invention

The present invention relates to an arm operation mechanism for moving a workpiece vertically and/or horizontally. The present invention also relates to an industrial robot including such an arm operation mechanism.

2. Description of the Related Art

A typical prior art industrial robot includes a plurality of arms pivotally connected to each other for vertically or horizontally moving a workpiece or processing tool held by one of the arms. Such a robot is often referred to as "articulated robot". An example of articulated robot is disclosed in JP-A-2000-24966 for example. For the convenience of description, the articulated robot disclosed in this Japanese document is illustrated in FIG. 6 of the accompanying drawings.

Figure 6:
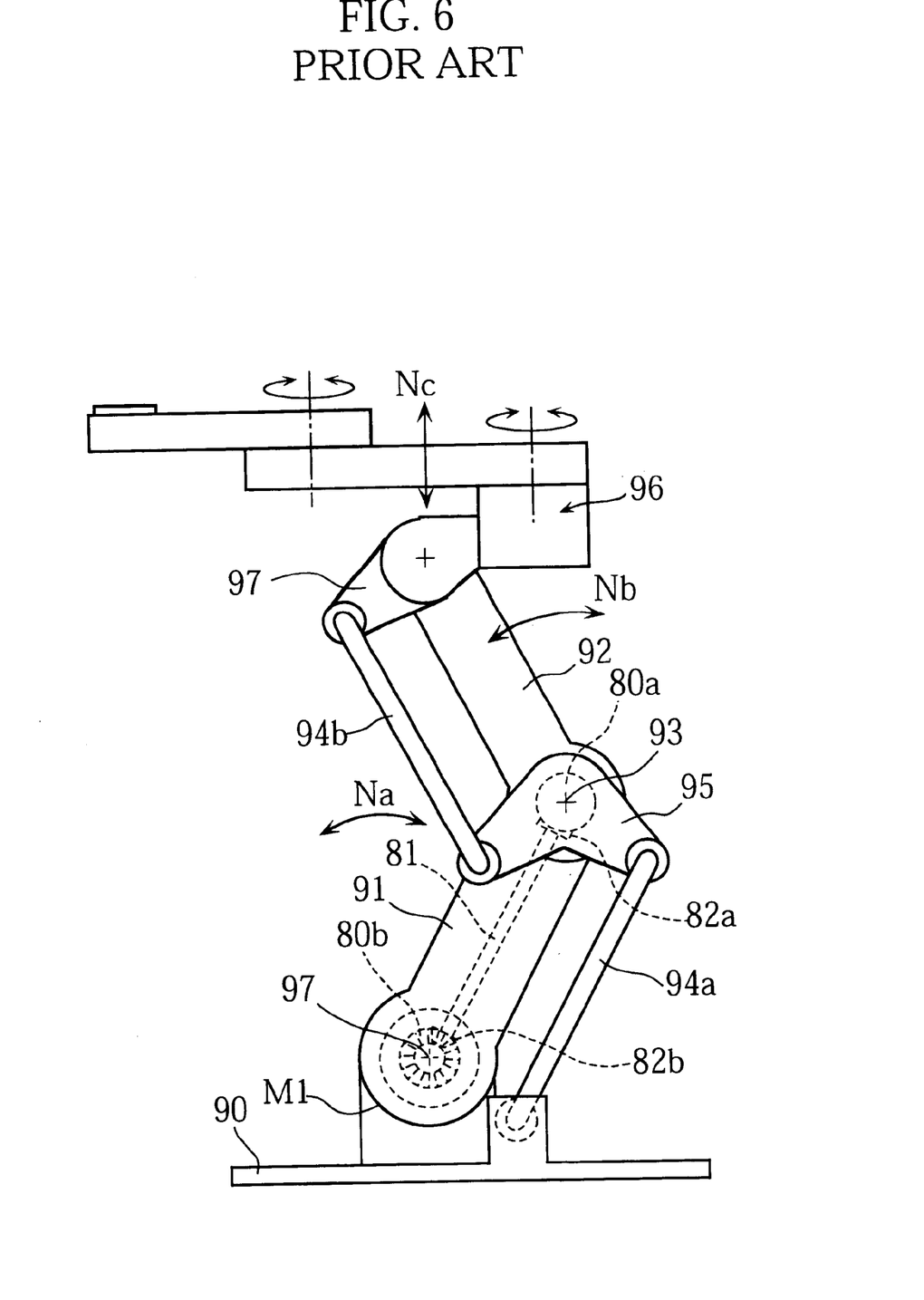
FIG. 6 is a side view showing a prior art industrial robot.

As shown in FIG. 6, the prior art industrial robot includes a machine base 90, a first arm 91 having a base end and a tip end, a second arm 92 having a base end and a tip end, a first parallel link 94a, a second parallel link 94b, and a link base 95. The base end of the first arm 91 is pivotally supported on the machine base 90, whereas the base end of the second arm 92 is pivotally connected to the tip end of the first arm 91 via a coupler 93. The tip end of the second arm 92 is provided with a workpiece holder 96 for holding a workpiece (not shown). the workpiece holder 96 is integrally pivotable with a lever 97.

The first arm 91 is driven by a motor M1 for rotation about a fixed axis 97. The base end of the second arm 92 is provided with a gear 80a which is connected, via a shaft 81, to a gear 80b which is rotated by the motor M1. The opposite ends of the shaft 81 are provided with bevel gears 82a, 82b for meshing with the gears 80a, 80b, respectively.

One parallel link 94a is pivotally connected to the machine base 90 and to the link base 95, respectively. The other parallel link 94b is pivotally connected to the link base 95 and to the lever 97 of the workpiece holder 96.

With the above-described structure, when the first arm 91 is rotated about the axis 97 in the arrow Na directions, the second arm 92 rotates about the coupler 93 in the arrow Nb directions. Thus, the tip end of the second arm 92 and the workpiece holder 96 move up and down in the arrow Nc directions.

However, the above-described prior art robot has the following drawbacks. In the prior art robot, the rotational force of the gear 80b driven by the motor M1 is transmitted to the gear 80a via the shaft 81 for rotating the second arm 92 based on the rotation of the first arm 91. Therefore, the shaft 81 needs to be substantially equal, in length, to the first arm 91. Further, though not illustrated, the first arm 91 need be provided with a support mechanism, which may include a bearing for example, for supporting the shaft 81. Thus, the provision of the shaft 81 and the support mechanism in the arm 91 increases the size of the first arm 91, which leads to an increase in the overall size of the robot. Further, the provision of the shaft 81 and the support mechanism, which may be relatively large in weight, also increases the inertia of the first arm 91 during the rotation. Therefore, it may often be difficult to make the first arm 91 move quickly unless the motor M1 is high-powered.

SUMMARY OF THE INVENTION

It is an object of the present invention to provide an arm operation mechanism which operates suitably while having a simple structure and relatively small size and weight.

Another object of the present invention is to provide an industrial robot incorporating such an arm operation mechanism.

According to a first aspect of the present invention, there is provided an arm operation mechanism which comprises a support, a first arm, a second arm, a link base, a parallel link, and a conversion mechanism. The first arm has a tip end and a base end, and the base end of the first arm is pivotally connected to the support for rotation relative to the support. The second arm has a base end pivotally connected to the tip end of the first arm for rotation relative to the first arm. The link base is pivotally connected to the first arm for rotation relative to the first arm. The parallel link keeps a constant posture of the link base upon the rotation of the first arm. The conversion mechanism converts the rotation of the link base relative to the first arm into the rotation of the second arm relative to the link base.

Preferably, when the first arm rotates relative to the support in one direction through a first angle, the conversion mechanism causes the second arm to rotate relative to the first arm in an opposite direction through a second angle which is twice the first angle.

Preferably, the conversion mechanism comprises a first gear fixedly mounted to the link base, and a second gear rotatably mounted to the first arm in mesh with the first gear and operatively connected to the base end of the second arm.

Preferably, the conversion mechanism further comprises a third gear coaxial and integrally rotatable with the second gear, and a fourth gear fixedly connected to the second arm in mesh with the third gear. In this case, the fourth gear is fixedly connected to the base end of the second arm via a sleeve on which the first gear is coaxially and rotatably fitted. Further, the first gear and the second gear have a gear ratio of 1:1 while the third gear and the fourth gear have a gear ratio of 2:1. Moreover, the first arm may be hollow to accommodate all of the first through the fourth gears.

According to a second aspect of the present invention, there is provided an industrial robot comprising a holder and an arm operation mechanism for movably supporting the holder. The arm operation mechanism comprises a support, a first arm, a second arm, a link base, a parallel link, and a conversion mechanism. The first arm has a tip end and a base end, and the base end of the first arm is pivotally connected to the support for rotation relative to the support. The second arm has a base end pivotally connected to the tip end of the first arm for rotation relative to the first arm. The link base is pivotally connected to the first arm for rotation relative to the first arm. The parallel link keeps a constant posture of the link base upon the rotation of the first arm. The conversion mechanism converts the rotation of the link base relative to the first arm into the rotation of the second arm relative to the link base.

Preferably, the arm operation mechanism causes the tip end of the second arm to move vertically, and the holder includes a hand for supporting and moving a workpiece horizontally. The hand may be rotatable about a vertical axis. Further, the holder may also include a holder support pivotally connected to the tip end of the second arm, and the arm operation mechanism additionally includes a second parallel link pivotally connected to the link base and the holder support for constantly keeping the hand in a horizontal posture.

Other features and advantages of the present invention will become clearer from the detailed description given below with reference to the accompanying drawings.

DETAILED DESCRIPTION OF THE PREFERRED EMBODIMENTS

Preferred embodiments of the present invention will be described below in detail with reference to the accompanying drawings.

Figure 1:
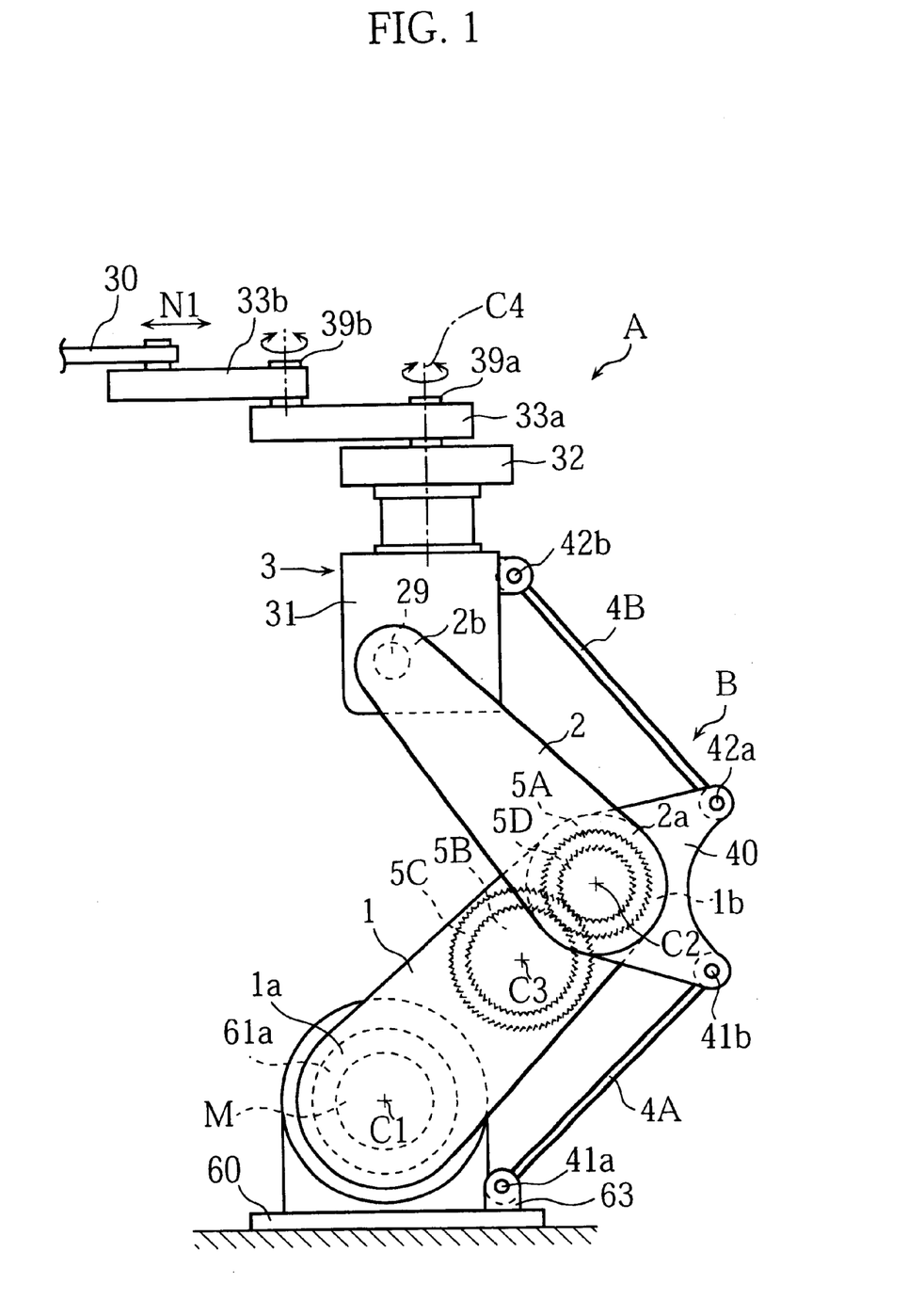
FIG. 1 is a side view showing an industrial robot incorporating an arm operation mechanism embodying the present invention.
Figure 2:
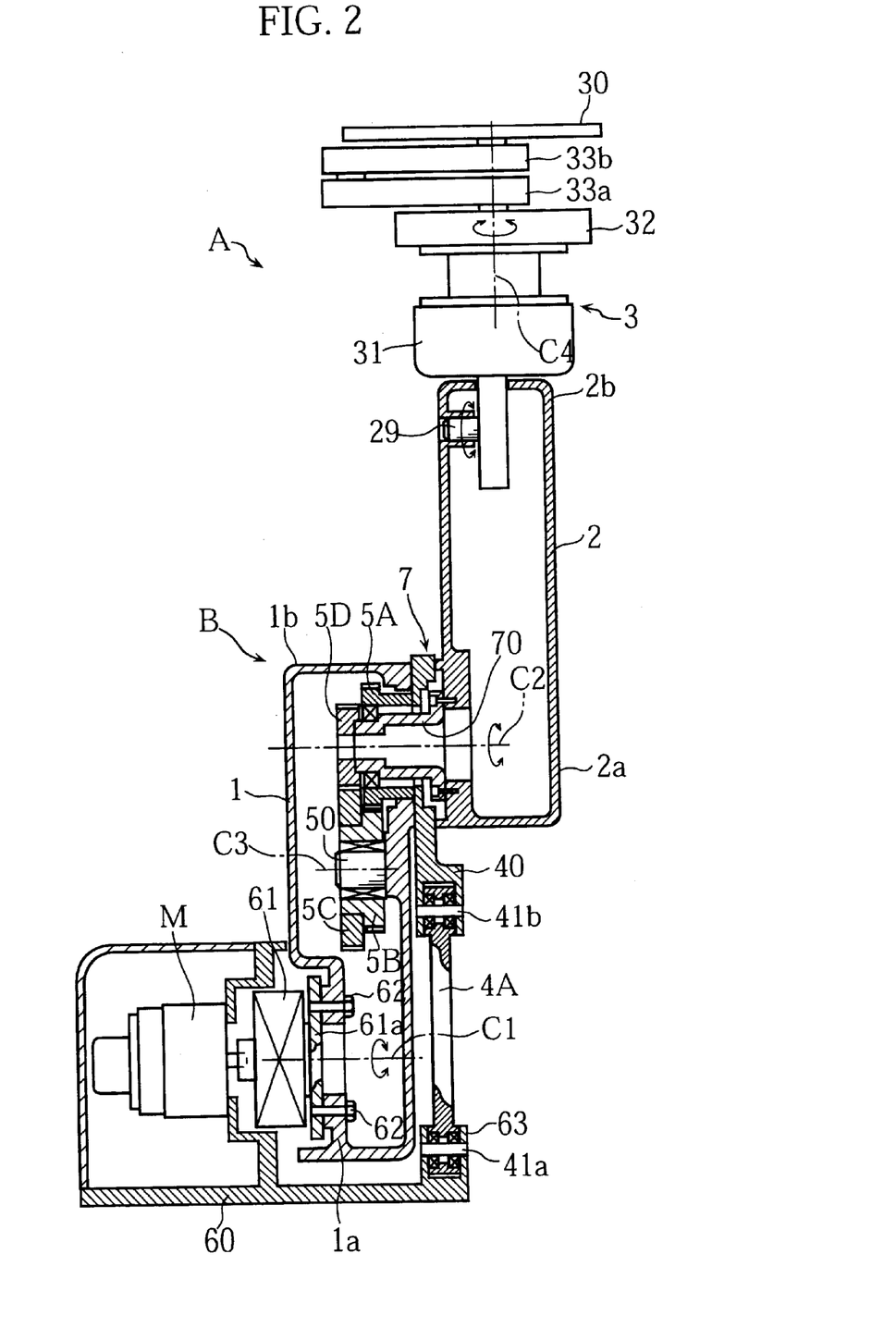
FIG. 2 is a vertical sectional view of the industrial robot of FIG. 1.
Figure 3:
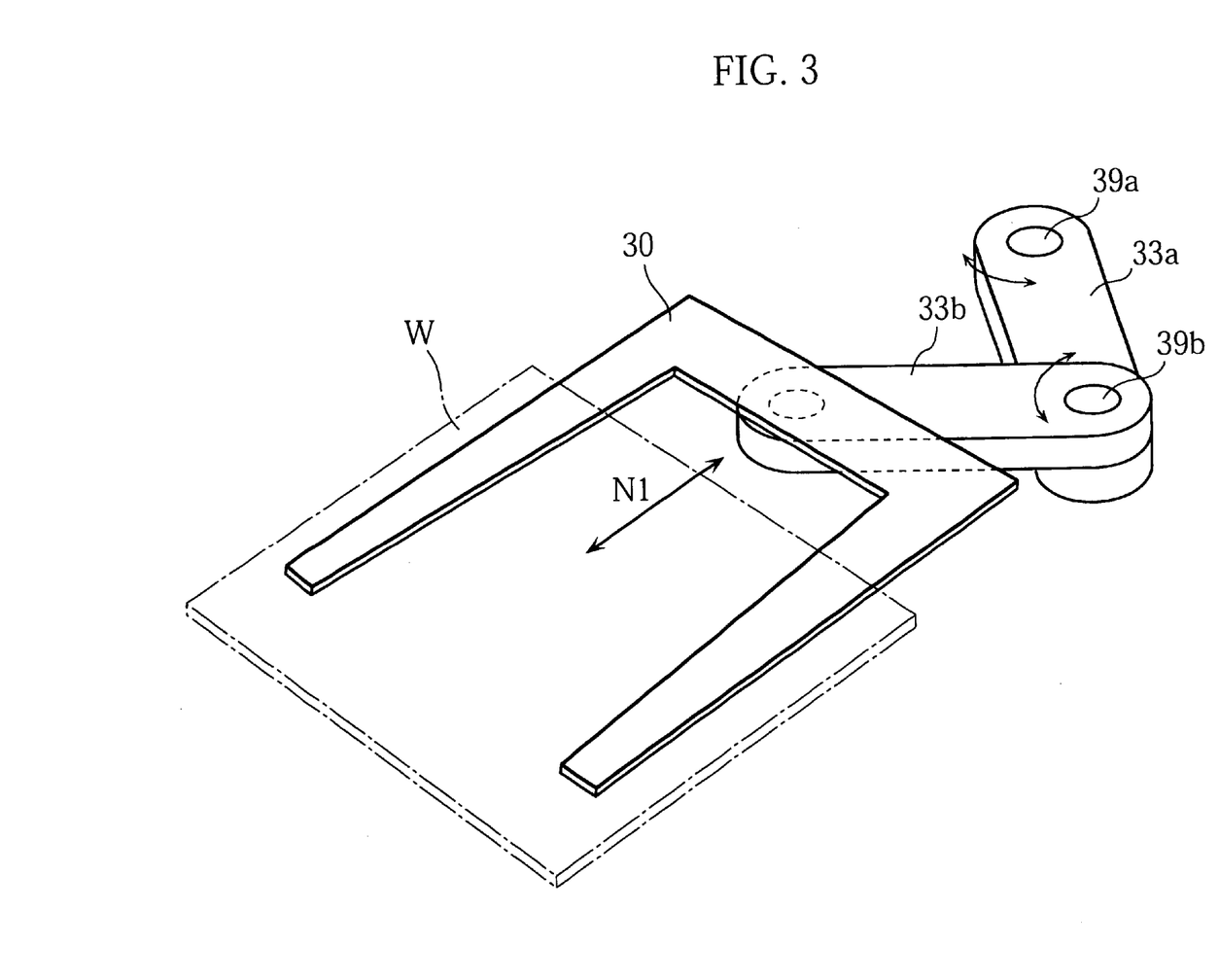
FIG. 3 is a schematic perspective view of a workpiece holder incorporated in the robot.

FIGS. 1–3 illustrate an industrial robot according to a first embodiment of the present invention. The illustrated industrial robot A is a transfer robot for holding and transferring workpieces. Specifically, as clearly shown in FIGS. 1 and 2, the transfer robot A includes a workpiece holder 3 having a hand 30 for holding a workpiece, and an arm operation mechanism B. The workpiece holder 3 is supported by the arm operation mechanism B for vertical movement. The arm operation mechanism B includes a machine base 60 for fixation on a floor for example, a first arm 1, a second arm 2, a link base 40, a first parallel link 4A, a second parallel link 4B, and a first through a fourth gears 5A–5D.

As clearly shown in FIG. 2, the first arm 1 is hollow and has a base end 1a and a tip end 1b. The base end 1a is attached to an output plate 61a of a reduction gear 61 via bolts 62. The reduction gear 61 functions to reduce the rotational speed of the output shaft of a motor M fixed to the machine base 60. Thus, the first arm 1 is driven by the motor M for rotation about a horizontally extending central axis C1 of the output plate 61a. The output plate 61a of the reduction gear 61 directly supports the first arm 1. Alternatively, however, the first arm 1 may be rotatably supported on a shaft attached to the machine base 60, and a mechanism may be provided separately from the shaft for transmitting the rotation of the reduction gear 61 to the first arm 1.

Similarly to the first arm 1, the second arm 2 is hollow and has a base end 2a and a tip end 2b. The base end 2a is connected to the first arm 1 and the link base 40 via a coupler 7 so that the link base 40 is sandwiched between the base end 2a of the second arm 2 and the tip end 1b of the first arm 1. Thus, the second arm 2 is rotatable about a horizontally extending central axis C2 of the coupler 7. Since the coupler 7, which rotatably connects the first and the second arms 1, 2 relative to the link base 40, has a conventionally known structure, the detailed description thereof will be omitted.

The first through the fourth gears 5A–5D are spur gears arranged in the first arm 1. The first gear 5A is fixed to the link base 40 so that its central axis C2 coincides with that of the coupler 7. The second gear 5B meshes with the first gear 5A and is rotatably mounted on a shaft 50 fixed to the first arm 1.

The third gear 5C is fixed on the second gear 5B for rotation therewith. The third gear 5C has a central axis C3 which coincides with that of the second gear 5B. Alternatively, a single gear formed with two series of gear teeth may take the place of the second and the third gears 5B, 5C. The fourth gear 5D is fixedly mounted to the second arm 2 via a sleeve 70. The sleeve 70 is fixed to a side surface of the second arm 2 at the base end 2a while projecting into the first arm 1 through openings provided in the link base 40 and the first arm 1. The fourth gear 5D has a central axis C2 which coincides with that of the coupler 7. Thus, when the rotation of the second and the third gears 5B, 5C is transmitted to the fourth gear 5D, the second arm 2 is rotated about the central axis. C2 of the coupler 7. The gear ratio between the first gear 5A and the second gear 5B may be 1:1 for example. The gear ratio between the third gear 5C and the fourth gear 5D may be 2:1 for example.

The first parallel link 4A is a rod having a base end pivotally connected to a bracket 63 of the machine base 60 via a shaft 41a and an tip end pivotally connected to the link base 40 via a shaft 41b. Thus, the first parallel link 4A, the link base 40, the first arm 1 and the machine base 60 provide a link mechanism which includes four connection points defining a parallelogram. The link base 40 constantly keeps a predetermined posture regardless of the rotational angle of the first arm 1.

The workpiece holder 3 includes a holder support 31, a rotary plate 32 supported on the holder support 31, horizontal arms 33a, 33b for horizontally moving the hand 30. As shown in FIG. 3, the hand 30 may comprise a generally U-shaped plate for carrying a workpiece W thereon. The hand 30 is supported on a tip end of the horizontal arm 33b. The horizontal arm 33a is rotatable about a shaft 39a connecting the arm 33a to the horizontal plate 32, whereas the horizontal arm 33b is rotatable about a shaft 39b connecting the arm 33b to the arm 33a. By the rotation of the arms 33a, 33b, the hand 30 is reciprocally movable in the arrow N1 directions in a horizontal plane. The rotary plate 32 is rotatable about a vertically extending axis C4 (See FIG. 1), which enables the hand 30 to change the direction of the movement within a horizontal plane.

The holder support 31 is connected to the tip end 2b of the second arm 2 via a shaft 29 so that the holder support 31 is rotatable relative to the second arm 2. The second parallel link 4B has a base end pivotally connected to the link base 40 via a shaft 42a and a tip end pivotally connected to the holder support 31 via a shaft 42b. (The second parallel link 4B is not illustrated in FIG. 2.) Thus, the second parallel link 4B, the linkbase 40, the second arm 2 and the holder support 31 provide a link mechanism which includes four connection points defining a parallelogram. Similarly to the link base 40, the holder support 31 constantly keeps a predetermined posture regardless of the rotational angle of the second arm 2.

The operation of the above-described industrial robot A will be described below.

Figure 4:
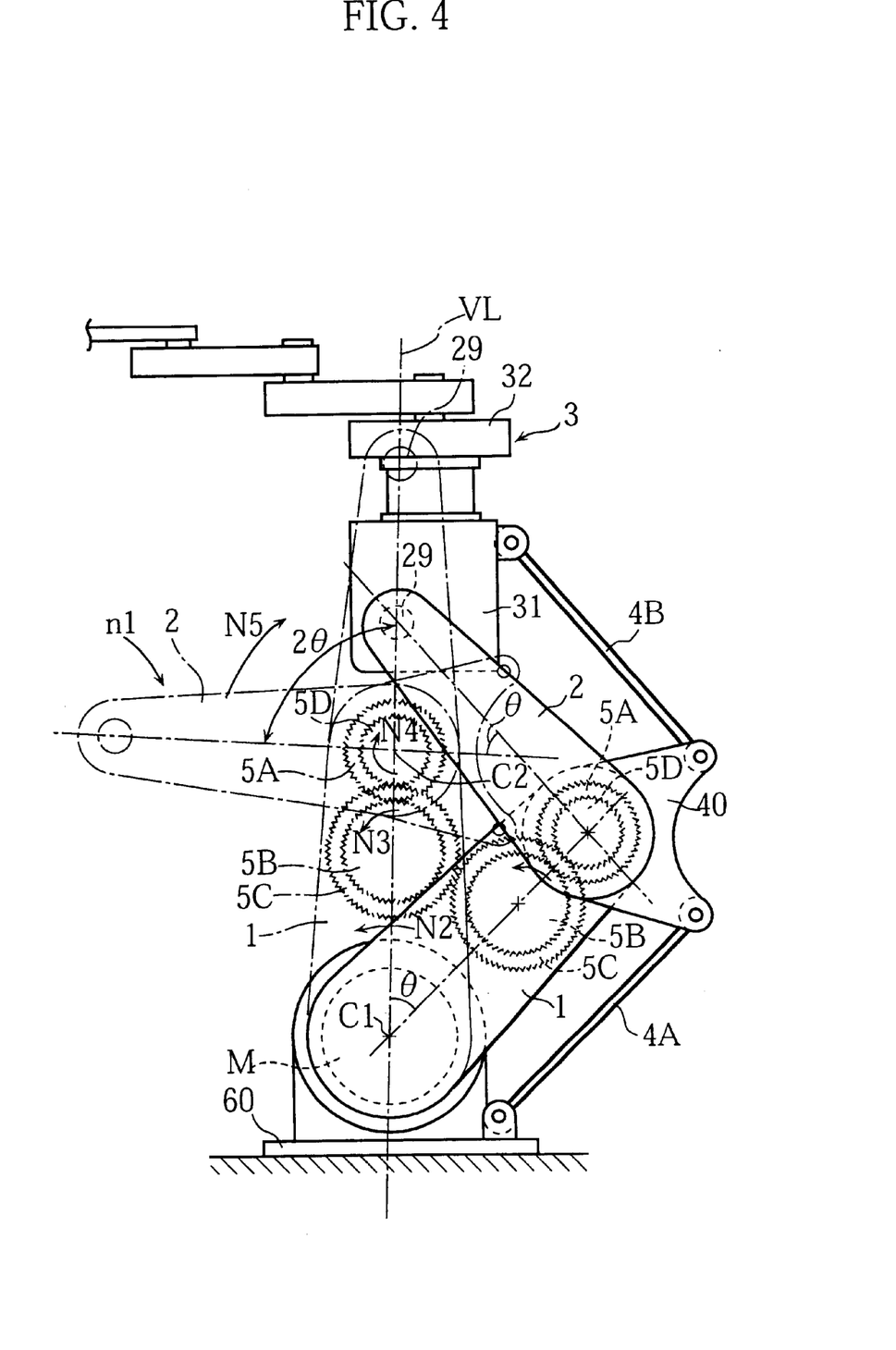
FIGS. 4 and 5 are side views similar to FIG. 1 for illustrating how the industrial robot of FIG. 1 operates.

It is now assumed that the first arm 1 initially has a posture inclined relative to the vertical line VL at an angle θ, as depicted in FIG. 4. When the first arm 1 is rotated by the motor M about the central axis C1 through the angle θ in the arrow N2 direction, the first arm 1 takes a vertical posture, as depicted by phantom lines in the figure. At this time, although the link base 40 rotates about the central axis C1 following the rotation of the first arm 1, the link base 40 keeps its initial posture due to the operation of the first parallel link 4A. Therefore, the link base 40 rotates relative to the first arm 1. Thus, the first gear 5A fixed to the link base 40 c the first arm 1 and causes the second and the third gears 5B, 5C to rotate through the angle θ in the arrow N3 direction. The rotation of the second and the third gears 5B, 5C causes the fourth gear 5D to rotate in the opposite direction. As a result, the second arm 2 rotates about the central axis C2 in the arrow N4 direction. At this time, since the gear ratio between the third gear 5C and the fourth gear 5D is 2:1, the second arm 2 rotates in that direction through the angle 2θ relative to the first arm 1.

Figure 5:
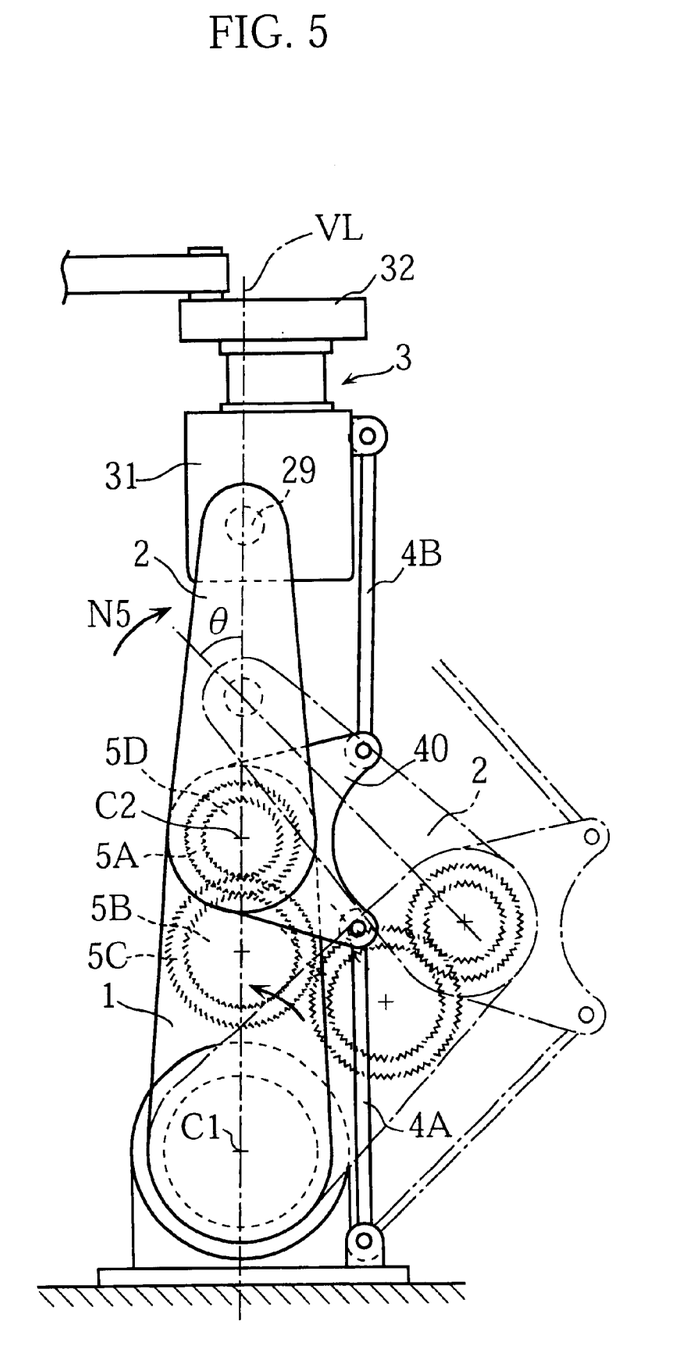

Assuming that the second arm 2 does not rotate relative to the first arm 1, when the first arm 1 rotates in the arrow N2 direction through the angle θ from the initial inclined posture, the second arm 2 shifts to a posture indicated by the reference sign n1 in FIG. 4. In this case, the second arm rotates in the arrow N2 direction through the angle θ. In reality, however, due to the meshing of the third gear 5C and the fourth gear 5D, the second arm 2 rotates through the angle 2θ in the arrow N5 direction. Thus, the second arm 2 takes a posture shifted rotationally about the central axis C2 through the angle θ in the arrow N5 direction relative to the initial posture, as shown in FIG. 5.

In this way, due to the arm operation mechanism B, when the first arm 1 is rotated through a predetermined angle about the central axis C1 in one direction, the second arm 2 shifts rotationally through the same angle in an opposite direction relative to its initial position. Therefore, the shaft 29 provided at the tip end 2b of the second arm 2 moves vertically along the vertical line VL, thereby moving the workpiece holder 3 vertically up and down. Thus, combined with the horizontal movement provided by the workpiece holder 3, the transfer robot is capable of conveniently moving the hand 30 three dimensionally.

As described above, the second arm 2 rotates due to the operation of the first through the fourth gears 5A–5D based on the rotation of the link base 40 relative to the first arm 1. Therefore, the first arm 1 need not incorporate an additional shaft for transmitting the driving force of the motor M to the second arm 2. Further, an additional motor for driving the second arm 2 is also unnecessary.

The first through the fourth gears 5A–5D are illustrated in the figures as somewhat exaggerated in size. However, these gears may be actually smaller. Therefore, the first and the second arms 1, 2 need not incorporate large parts so that the arms 1, 2 can be reduced in size. Further, since the first and the second arms 1, 2 and other movable portions can be reduced also in weight, the inertia in rotating the arms can be reduced, which enhances the operation performance.

The present invention is not limited to the above-described embodiment. The specific structure of the parts of the industrial robot, particularly of the arm operation mechanism, may be modified in various ways.

In the above-described embodiment, the first gear fixed to the link base meshes with the second gear rotatably mounted to the first arm so that the second gear rotates due to the relative rotation between the first arm and the link base. However, the present invention is not limited to such a structure. Alternatively, for example, the first gear may be fixed to the first arm whereas the second gear may be rotatably mounted to the link base. Also with this structure, the second gear rotates due to the relative rotation between the first arm and the link base.

The arm operation mechanism B may utilize parts other than gears. For example, the gears 5C, 5D may be replaced by a combination of a timing pulley and a timing belt or a combination of a sprocket and a chain for rotating the second arm 2 utilizing the rotational force of the second gear 5B.

Although the arm operation mechanism B of the illustrated embodiment may be used for vertically moving the tip end of the second arm 2, it may be utilized for horizontally moving the tip end of the second arm 2 for horizontally moving the hand 30 for example. The arm operation mechanism may also be used for other purposes and is not limited to a specific use.

The industrial robot according to the present invention is not necessarily constituted as a transfer robot having a generally U-shaped hand, but may be constituted as another kind of robot such as a welding robot for example.

The present invention being thus described, it is apparent that the same may be varied in many ways. Such variations should not be regarded as a departure from the spirit and scope of the present invention, and all such modifications as would be obvious to those skilled in the art are intended to be included within the scope of the following claims.

What is claimed is:

1. An arm operation mechanism comprising:

a support;

a first arm having a tip end and a base end, the base end of the first arm being pivotally connected to the support for rotation relative to the support;

a second arm having a base end pivotally connected to the tip end of the first arm for rotation relative to the first arm;

a link base pivotally connected to the first arm for rotation relative to the first arm;

a parallel link for keeping a constant posture of the link base upon the rotation of the first arm; and a conversion mechanism for converting the rotation of the link base relative to the first arm into the rotation of the second arm relative to the link base;

wherein the conversion mechanism comprises a first gear fixedly mounted to the link base, and a second gear rotatably mounted to the first arm in mesh with the first gear, the second gear being operatively connected to the base end of the second arm.

2. The arm operation mechanism according to claim 1, wherein when the first arm rotates relative to the support in one direction through a first angle, the conversion mechanism causes the second arm to rotate relative to the first arm in an opposite direction through a second angle which is twice the first angle.

3. The arm operation mechanism according to claim 1, wherein the conversion mechanism further comprises a third gear coaxial and integrally rotatable with the second gear, and a fourth gear fixedly connected to the second arm in mesh with the third gear.

4. The arm operation mechanism according to claim 3, wherein the fourth gear is fixedly connected to the base end of the second arm via a sleeve on which the first gear is coaxially and rotatably fitted.

5. The arm operation mechanism according to claim 3, wherein the first gear and the second gear have a gear ratio of 1:1 while the third gear and the fourth gear have a gear ratio of 2:1.

6. The arm operation mechanism according to claim 3, wherein the first arm is hollow, all of the first through the fourth gears being mounted within the first arm.

7. An industrial robot comprising a holder and an arm operation mechanism for movably supporting the holder, the arm operation mechanism comprising:

a support;

a first arm having a tip end and a base end, the base end of the first arm being pivotally connected to the support for rotation relative to the support;

a second arm having a tip end and a base end, the tip end of the second arm being connected to the holder, the base end of the second arm pivotally connected to the tip end of the first arm for rotation relative to the first arm;

a link base pivotally connected to the first arm for rotation relative to the first arm;

a parallel link for keeping a constant posture of the link base upon the rotation of the first arm; and a conversion mechanism for converting the rotation of the link base relative to the first arm into the rotation of the second arm relative to the link base;

wherein the conversion mechanism comprises a first gear fixedly mounted to the link base, and a second gear rotatably mounted to the first arm in mesh with the first gear, the second gear being operatively connected to the base end of the second arm.

8. The industrial robot according to claim 7, wherein when the first arm rotates relative to the support in one direction through a first angle, the conversion mechanism causes the second arm to rotate relative to the first arm in an opposite direction through a second angle which is twice the first angle.

9. The industrial robot according to claim 7, wherein the conversion mechanism further comprises a third gear coaxial and integrally rotatable with the second gear, and a fourth gear fixedly connected to the second arm in mesh with the third gear.

10. The industrial robot according to claim 9, wherein the fourth gear is fixedly connected to the base end of the second arm via a sleeve on which the first gear is coaxially and rotatably fitted.

11. The industrial robot according to claim 9, wherein the first gear and the second gear have a gear ratio of 1:1 while the third gear and the fourth gear have a gear ratio of 2:1.

12. The industrial robot according to claim 9, wherein the first arm is hollow, all of the first through the fourth gears being mounted within the first arm.

13. The industrial robot according to claim 7, wherein the arm operation mechanism causes the tip end of the second arm to move vertically, the holder includes a hand for supporting and moving a workpiece horizontally.

14. The industrial robot according to claim 13, wherein the hand is rotatable about a vertical axis.

15. The industrial robot according to claim 13, wherein the holder further includes a holder support pivotally connected to the tip end of the second arm, the arm operation mechanism further including a second parallel link pivotally connected to the link base and the holder support for constantly keeping the hand in a horizontal posture.

* * * * *